United States Patent Office 3,692,725
Patented Sept. 19, 1972

3,692,725
STABILIZED BINDER FOR WATER-FLUSHABLE NON-WOVEN WEBS
David V. Duchane, Menasha, Wis., assignor to Kimberly-Clark Corporation, Neenah, Wis.
No Drawing. Filed Oct. 28, 1970, Ser. No. 84,880
Int. Cl. C08f 29/26
U.S. Cl. 260—29.6 BM
12 Claims

ABSTRACT OF THE DISCLOSURE

A stabilized binder mixture for application to non-woven webs to provide a water-flushable wrapper for absorbent pads such as sanitary napkins, diapers and the like. A highly viscous solution of polyvinyl alcohol containing reactive chemicals which form crosslinking alkaline borates in situ upon heating is reduced to workable viscosity by saturating the solution with carbon dioxide. Alternatively a solution initially low in viscosity is maintained at workable viscosity by saturating the polyvinyl alcohol solution with $CO_2$ before adding the other chemicals.

CROSS REFERENCE TO RELATED APPLICATIONS

Co-pending applications by David V. Duchane, Ser. No. 13,588 now Pat. No. 3,654,928 and Ser. No. 13,842 both filed Feb. 24, 1970.

BACKGROUND OF THE INVENTION

Cold-water soluble polyvinyl alcohols have been found to be effective binders for flushable sanitary napkin wrappers made from non-woven structures such as carded fiber webs. While non-woven napkin wrappers bonded with polyvinyl alcohol are easily flushable, they tend to be low in strength at the intermediate moisture levels encountered in use. The strength of the binder under conditions of limited moisture can be enhanced by treating a freshly bonded web with a solution of borax as described in the aforementioned copending application Ser. No. 13,588.

By another method described in co-pending application Ser. No. 13,842 a more water-resistant polyvinyl alcohol based binder may be applied to the carded web cover in a one step process with the borax formed in situ. This method involves preparing a binder solution containing polyvinyl alcohol, boric acid and sodium bicarbonate, and applying the solution by spraying, dipping or printing to the web to be bonded. As the treated web is dried by heating or the like, the boric acid and sodium bicarbonate in the binder solution react to form sodium tetraborate (borax), water and carbon dioxide. As the carbon dioxide and water are driven off, the pH rises, and the newly-formed borax which remains reacts with the polyvinyl alcohol to render it temporarily water resistant.

One disadvantage of this latter described one-step borating method, is that when attempts are made to use this type of binder solution with a high concentration of solids, the solution becomes much too viscous for practical application. For example, a solution of 4% polyvinyl alcohol, 0.2% boric acid and 0.14% sodium bicarbonate has a viscosity of about 1,000 centipoises and is suitable for application to a web by conventional methods. A solution in which the solids content is increased by 50%, i.e., 6% polyvinyl alcohol, 0.3% boric acid, and 0.21% sodium bicarbonate has a much higher viscosity of 68,000 cps. and is too thick and viscous to be useful.

It has been found that the addition of any strong acid which will bring the pH of the reacting solution described above to a pH of less than 5.5 will prevent an increase in viscosity, whereby the viscosity remains approximately the same as a solution of polyvinyl alcohol alone. Apparently, such an acid prevents borax from being prematurely formed, avoiding crosslinking of polymer chains by borate ions. Thus, a solution of 12% polyvinyl alcohol, 0.6% boric acid, 0.42% sodium bicarbonate, and 0.6% concentrated hydrochloric acid (approximate mole ratio

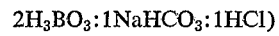

has a viscosity of only about 1,000 cps., even though in this case the concentration of solids is more than twice that of the same solution without hydrochloric acid which has a viscosity of 68,000 cps. While the added hydrochloric acid reduces viscosity to desired levels, it was found that it apparently competes with the boric acid present in reacting with the bicarbonate ion. Thus, in the solution containing hydrochloric acid, or another strong acid, there is enough strong acid present to react with all the sodium bicarbonate and completely form sodium chloride instead of an alkaline borate. Furthermore, since the hydrochloric acid is much stronger in acidity than the boric acid, it reduces the ionization of the boric acid. Thus, when hydrochloric or similarly strong acids are used to acidify the adhesive system, they react preferentially with the sodium bicarbonate, and the modifying materials in the polyvinyl alcohol binder after drying are boric acid and sodium chloride rather than the desired borax. Accordingly, the desired crosslinking of the polyvinyl alcohol which requires the presence of borax or an alkaline borate does not take place to an appreciable extent and the polyvinyl alcohol does not develop its desired water-resistant properties. If a smaller amount of hydrochloric acid is used, so that only part of the sodium bicarbonate reacts to form sodium chloride in the drying process, only a slight increase in concentration of the polyvinyl alcohol polymer can be made before reaching unworkable viscosity. For example, a solution of 5.4% polyvinyl alcohol, 0.3% boric acid, 0.21% sodium bicarbonate and 0.075% concentrated hydrochloric acid (mole ratio—

has a viscosity of about 1,700 cps. While this viscosity permitted the solution to be printed on a non-woven web initially, when an attempt was made to do this in a test run, the adhesive gelled on the print roll after a very brief trial, and the test run had to be discontinued. Furthermore, even formulations having a reduced ratio of hydrochloric acid tend to gel with increasing rapidity as the concentration of polyvinyl alcohol is increased. With the reduced ratio of hydrochloric acid complete gelling was found to occur before reaching a solution concentration of about 7.2% polyvinyl alcohol.

This invention therefore is directed to providing a binder solution containing a relatively high solids concentration of polyvinyl alcohol as the binder in combination with chemicals which form crosslinking borax or an alkaline borate in situ, at a viscosity which remains low enough in use to be suitable for application to a non-woven fiber web.

SUMMARY OF THE INVENTION

In summary, it has been found that the viscosity of a binder solution for non-woven webs, which solution comprises a mixture of polyvinyl alcohol and chemicals such as boric acid, sodium bicarbonate (or a similar weak base) and hydrochloric acid (or a similar strong acid) which form a crosslinking borax (or an alkaline borate) in situ upon heating, can be maintained at workable levels by incorporating carbon dioxide in such mixture. The carbon dioxide may be added to mixture containing all the desired ingredients and which is initially in a highly viscous unworkable state which the $CO_2$ addition quickly reduces to workable condition as saturation takes place.

Or the $CO_2$ may be added to a solution containing the polyvinyl alcohol alone whereby the solution remains at workable viscosity during and after the addition of the other chemicals. The carbon dioxide may be added in the form of Dry Ice or by any other convenient method such as bubbling it through the starting solution in gaseous form. The maintenance of low viscosity which results permits preparation of high solids binder solution for application to non-woven webs by conventional methods.

Accordingly, it is the principal object of this invention to provide means for maintaining what is normally a highly viscous binder solution containing water soluble polyvinyl alcohol and chemicals which react to form cross-linking agents at a level suitable for application to non-woven webs.

A further object is to provide a crosslinkable polyvinyl alcohol based binder for use in water-flushable non-woven fabrics which binder has a higher concentration of functional solids than has been possible hitherto.

These and other objects and advantages will become apparent by reference to the following detailed specification wherein there are described various selected embodiments of the invention.

DESCRIPTION OF PREFERRED EMBODIMENTS

In one example (Example 1), a solution comprising a mixture of 5.4% polyvinyl alcohol, 0.3% boric acid, 0.21% sodium bicarbonate and 0.075% concentrated hydrochloric acid (mole ratio—

$$2H_3BO_3 : 1NaHCO_3 : 0.25HCl$$

was found to have a viscosity of 1,700 cps. Carbon dioxide in the form of Dry Ice was introduced into the mixture. As the Dry Ice sublimed into gaseous form the mixture became saturated with $CO_2$ and the viscosity was reduced from 1,700 cps. to 100 cps.

While the original solution could be printed on to a carded web of non-woven fibers in limited quantities, it was found that when such printing was attempted, the solution soon gelled on the print roll making further application impractical. In contrast, when the same solution was reduced in viscosity by the addition of Dry Ice it was possible to print the solution onto a carded web in amounts of about 0.4–0.8 gram of binder per sq. yd. without gelling on the printing roll even after extended runs.

The tendency of the described adhesive to gel on the print roll might be explained as follows:

Borated polyvinyl alcohol adhesives tend to be more tacky than adhesives composed of polyvinyl alcohol alone so that even at viscosities at which normal polyvinyl alcohols can be printed, borated adhesives form a gel when spread out in a thin film as is done on the print roll. Addition of $CO_2$ to the formulation greatly reduces this tackiness as a result of its effective lowering of the pH and viscosity of the solution.

Further insurance against the possibility of premature gelling on the print roll can be obtained by applying a blanket of $CO_2$ around the exposed surface area of the print roll which carries the adhesive film. This practice tends to inhibit the escape of $CO_2$ from the mixture while on the roll which otherwise might cause gelling at that point.

In another example (Example 2), a solution of 8% polyvinyl alcohol, 0.4% boric acid, 0.28% sodium bicarbonate and 0.10% concentrated hydrochloric acid (approximate molar ratio $2H_3BO_3:1NaHCO_3:0.25HCl$) was found to form a gel with a viscosity too high to measure. When Dry Ice was added to this gel and mixed vigorously into it, the gel soon thinned and became quite liquid with a measured viscosity of about 1,700 cps. This solution was capable of being printed on a carded web without premature gelling.

Both of these examples demonstrate that a highly viscous solution containing the desired reactive chemical mixture can be reduced to workable viscosity by the saturation therewith with $CO_2$. Alternatively, gelling can be prevented and workable viscosity can be maintained all the while the solution is being prepared, by first saturating with $CO_2$ containing polyvinyl alcohol alone before adding the other chemicals.

It would seem appropriate to discuss the theory associated with this phenomenon here. The crosslinking of the polyvinyl alcohol by the borate ion which produces the decreased water sensitivity desired in the adhesive binder described herein appears to be reversible and is quite sensitive to pH. Even the weak carbonic acid formed by carbon dioxide in saturated solution is apparently strong enough to prevent the aforementioned crosslinking process, or even to reverse it. Because carbonic acid is a weak acid, it does not compete as strongly as hydrochloric acid with the boric acid for reaction with the bicarbonate ion. In fact, since carbonic acid is one product of the reaction of the bicarbonate ion and boric acid, it is theorized that its introduction into the solution apparently prevents reaction between the hydrochloric acid and the bicarbonate ion and thus keeps the solution viscosity low.

As soon as the reduced viscosity adhesive has been applied to the web and drying begins, carbon dioxide begins to escape. As carbon dioxide escapes the unstable carbonic acid is broken down into water and more carbon dioxide. The reaction then goes to completion, sodium tetraborate (borax) forms and the desired delayed gelling effect and increased water resistance in the binder occurs.

Prior to this invention, application of borated polyvinyl alcohol adhesives to non-woven webs was limited to low solids solutions, i.e., about 3% polyvinyl alcohol for spray application and less than about 5% polyvinyl alcohol for printing applications. The ability to provide polyvinyl alcohol solutions of greater solids concentration and lower viscosity permits better control of the binding process which results in improved non-woven webs for flushable products.

As disclosed in the above-mentioned prior applications, the function of the borated polyvinyl alcohol binder under high moisture conditions can be improved by the addition of properly selected plasticizers without inhibiting eventual disposal in water-based sewerage systems. Polyglycol plasticizers of intermediate weight such as polyethylene glycol 300, methoxypolyethylene glycol 350 and polypropylene glycol 425 are especially suitable.

Additional preferred examples of binders in accordance with this invention and also including plasticizers are described below.

EXAMPLE 3

A solution containing 5.4% polyvinyl alcohol, 0.3% boric acid, 0.21% sodium bicarbonate, 0.6% methoxypolyethylene glycol 350 and 0.225% concentrated hydrochloric acid was saturated with $CO_2$ by using Dry Ice. The solution had a viscosity of 150 cps.

The solution was printed on a carded web of 1.5 denier rayon fibers 1 9/16" length. The web weight was approximately 14 grams/sq. yd.

A similar web was printed with a 12% solution of polyvinyl alcohol alone, and the physical characteristics of the two webs compared. Results were as follows:

| Web type | Adhesive binder used | |
|---|---|---|
| | PVA alone | Example 3 |
| Adhesive add-ons (gms./yd.²) | 1.28 | 0.71 |
| Burst strength (gms./cm.²): | | |
| Dry | 265 | 208 |
| Wetted with 100% moisture | 23 | 42 |
| Wetted with 500% moisture | 23 | 19 |
| After soaking ½ min. in water | 0 | 0 |

The results indicate that the borated adhesive of Example 3 binders gives strength of comparable value to polyvinyl alcohol alone even though the adhesive add-on is less than 60% of the latter. The important figure to note is that at 100% moisture which is about the normal condition encountered in use, the borated adhesive provides significantly higher strength. Yet when completely soaked it dissolves completely as desired for disposal purposes.

The polyvinyl alcohol employed in the 3 examples described above was of a type which was about 79–82% hydrolyzed, had a viscosity of about 22 cps. (4% solution at 20° C.), and was readily soluble in cold water. Other polyvinyl alcohols were also found to perform well as long as they were cold-water soluble. For example, polyvinyl alcohols having a percent hydrolysis in the range of 74 to about 98 are generally cold-water soluble and are suitable for the described use.

The following additional examples use a polyvinyl alcohol which is 87–89% hydrolyzed and has a viscosity in the range of 21 to 25 cps. (4% solution at 20° C.).

EXAMPLE 4

A solution containing 5.4% of 87–89% hydrolyzed polyvinyl alcohol, 0.3% boric acid, 0.21% sodium bicarbonate, 0.6% methoxypolyethylene glycol 350 and 0.075% concentrated hydrochloric acid was saturated with $CO_2$ by bubbling gas through the mixture. The resulting solution had a viscosity of 160 cps.

The solution was printed on a carded web of the type previously described and compared with a similar web printed with a 10% solution of the same polyvinyl alcohol in unmodified form.

Results were as follows:

| Web type | Adhesive binder used | |
|---|---|---|
| | PVA alone | Example 4 |
| Adhesive add-on (gms./yd.²) | 0.95 | 0.81 |
| Burst strength (gms./cm.²): | | |
| Dry | 179 | 245 |
| Wetted with 100% moisture | 22 | 61 |
| Wetted with 500% moisture | 25 | 30 |
| After soaking ½ min. in water | 0 | 0 |

It is again apparent that the important wet burst strength characteristics of the web bonded with borated adhesives are superior even though less adhesive is used compared to the web bonded with unmodified polyvinyl alcohol.

While emphasis throughout this specification so far has been on the use of a mixture which reacts to form borax when heated, it has also been found that other forms of alkaline borate will produce the desired results. For example, other soluble bicarbonates such as potassium or ammonium bicarbonate may be substituted for the sodium bicarbonate whereupon the resulting borate will be the potassium or ammonium salt, respectively. Other weak bases may also be used, including organics such as the primary and secondary amines, including monoethanolamine, diethanolamine and piperidine, which will react to form an amine salt of boric acid.

The strong acid mentioned in the specific examples and general discussion has been identified as hydrochloric acid. While hydrochloric acid is preferred, other strong acids, both inorganic and organic, which are stronger than boric acid may be used. Typically this includes any acid with a pKa of less than 9.0 which is soluble and compatible with the adhesive mixture.

The concentration of polyvinyl alcohol in these adhesives may be in the range of about 4 to 12%; preferably from about 5 to 9%.

The boric acid should be present in the range of from about 2 to 10% based on the PVA. This calculates out to a range of about .08% to 1.20% of the adhesive formulation. The preferred amount of boric acid is about 5% of the PVA, or from 0.20 to 0.50% of the adhesive formulation.

The alkali should be present to provide from 0.25 to 0.75 equivalent of the base per mole of boric acid. The amount will depend on the molecular weight and the number of equivalents per mole of the base. The preferred amount is 0.5 equivalent base per mole of boric acid.

The strong acid should be present in the minimum amount needed to prevent gelling. This amount must be less than the stoichiometric equivalent of the base, or the desired alkali borate will not form at all and none of the desired cross-linking will occur.

The gelling appears to occur at pH levels about 6.5 so the pH must be kept below this level prior to the bonding step.

The lower viscosity adhesive described herein may be applied to non-woven webs by spraying, impregnation, printing or the like. Carded fiber webs are the most common type, but the adhesive is equally useful in binding air formed or drawn fiber webs.

The finished webs are especially suitable for sanitary napkin wrappers, however, it will readily be seen that the web may be used in connection with other disposable absorbent pads such as diapers, bed pads, bandages and the like.

What is claimed is:

1. A binder for non-woven webs comprising an aqueous solution of from about 4 to 12% polyvinyl alcohol, boric acid in the amount of about 2 to 10% based on the polyvinyl alcohol, a weak base in the amount of about 0.25 to 0.75 mole equivalent per mole of boric acid, and a strong acid in an amount less than the stoichiometric equivalent of the base, said acid having a pKa of less than 9.0 and being present in an amount to maintain said solution at a pH less than about 6.5, said solution containing carbon dioxide to saturation.

2. The binder of claim 1 wherein the polyvinyl alcohol is present in the amount of about 5 to 9%.

3. The binder of claim 1 wherein the boric acid is present in the amount of about 5% based on the polyvinyl alcohol.

4. The binder of claim 1 wherein the weak base is present in the amount of about 0.5 mole equivalent per mole of boric acid.

5. The binder of claim 1 in which said weak base is a soluble bicarbonate.

6. The binder of claim 5 in which said weak base is sodium bicarbonate.

7. The binder of claim 1 in which said weak base is a primary or secondary amine.

8. The binder of claim 7 in which said amine is selected from the group consisting of monoethanolamine, diethanolamine and piperidine.

9. The binder of claim 1 in which said strong acid is an inorganic acid.

10. The binder of claim 1 in which said strong acid is an organic acid.

11. The binder of claim 1 in which said solution also contains a plasticizer.

12. The binder of claim 11 in which said plasticizer is a polyglycol of intermediate molecular weight.

References Cited

UNITED STATES PATENTS

| 2,300,074 | 10/1942 | Strain | 117—47 |
| 2,376,371 | 5/1945 | Lowe et al. | 117—34 |
| 2,439,108 | 4/1948 | Staehle | 117—62 |
| 3,135,648 | 6/1964 | Hawkins | 161—249 |
| 3,320,200 | 5/1967 | Kane | 260—29.6 |
| 3,438,808 | 4/1969 | Hawkins et al. | 117—155 |

MELVIN GOLDSTEIN, Primary Examiner

U.S. Cl. X.R.

128—290 W